US010563691B2

(12) United States Patent
Hosen

(10) Patent No.: US 10,563,691 B2
(45) Date of Patent: Feb. 18, 2020

(54) BALL JOINT

(71) Applicant: NOK CORPORATION, Tokyo (JP)

(72) Inventor: Tatsuro Hosen, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 252 days.

(21) Appl. No.: 15/576,006

(22) PCT Filed: May 26, 2016

(86) PCT No.: PCT/JP2016/065566
§ 371 (c)(1),
(2) Date: Nov. 21, 2017

(87) PCT Pub. No.: WO2016/190385
PCT Pub. Date: Dec. 1, 2016

(65) Prior Publication Data
US 2018/0149192 A1 May 31, 2018

(30) Foreign Application Priority Data
May 28, 2015 (JP) .................................. 2015-108511

(51) Int. Cl.
F16C 11/06 (2006.01)
F16J 3/04 (2006.01)

(52) U.S. Cl.
CPC ........... *F16C 11/0671* (2013.01); *F16J 3/042* (2013.01); *F16J 3/048* (2013.01); *Y10T 403/315* (2015.01); *Y10T 403/32729* (2015.01)

(58) Field of Classification Search
CPC ... F16C 11/06; F16C 11/0666; F16C 11/0671; F16C 11/0695; F16J 3/04; F16J 3/042;
(Continued)

(56) References Cited

U.S. PATENT DOCUMENTS 2,456,546 A * 12/1948 Venditty ............. F16C 11/0604
277/635
3,208,779 A 9/1965 Sullivan, Jr.
(Continued)

FOREIGN PATENT DOCUMENTS

DE 4113569 A1 10/1991
DE 10207779 C1 * 10/2003 .......... F16C 11/0671
(Continued)

OTHER PUBLICATIONS

Extended European Search Report dated Oct. 8, 2018 (corresponding to EP16800089.1).

*Primary Examiner* — Josh Skroupa
(74) *Attorney, Agent, or Firm* — Harness, Dickey & Pierce, P.L.C.

(57) ABSTRACT

A ball joint (100) to be fitted to a knuckle (200) is provided wherein, a shaft section (11) has an annular projection (11a), a dust cover (30) has a seal main body which is made of an elastic body and which integrally includes: a body section (31); a fixed section (32) which is provided in the body section (31) on one end side; and an inner circumferential seal section (33) and a dust seal section (34) which are provided in the body section (31) on another end side, and the ball joint (100) is provided with a positioning member (40) which is mounted to the shaft section (11) in advance before the ball joint (100) is fitted to the knuckle (200) and which positions an end of the dust cover (30) on the other end side with respect to the shaft section (11) so that the inner circumferential seal section (33) is positioned at an opposite side of the spherical section (12) across the annular projection (11a).

4 Claims, 8 Drawing Sheets

(58) Field of Classification Search
CPC ........ F16J 3/048; F16J 15/52; Y10T 403/315; Y10T 403/32729
USPC .................................. 403/51, 134; 277/635
See application file for complete search history.

(56) References Cited

U.S. PATENT DOCUMENTS

| | | | | |
|---|---|---|---|---|
| 4,220,418 | A * | 9/1980 | Kondo | B62D 7/18 403/134 |
| 5,100,254 | A | 3/1992 | Wasada | |
| 6,814,521 | B2 * | 11/2004 | Suzuki | B60G 7/005 403/134 |
| 6,866,441 | B2 * | 3/2005 | Yokoyama | F16C 11/0671 403/51 |
| 7,040,833 | B2 * | 5/2006 | Kondoh | F16C 11/0638 403/135 |
| 7,441,979 | B2 * | 10/2008 | Heidemann | F16C 11/0671 403/134 |
| 8,714,861 | B2 * | 5/2014 | Bernhardt | F16C 11/0633 403/134 |
| 2003/0156894 | A1 * | 8/2003 | Suzuki | F16C 11/0671 403/134 |
| 2003/0156895 | A1 | 8/2003 | Yokoyama | |
| 2005/0105961 | A1 * | 5/2005 | Kondoh | F16C 11/0633 403/122 |
| 2010/0260538 | A1 * | 10/2010 | Brunneke | F16C 11/0671 403/134 |

FOREIGN PATENT DOCUMENTS

| | | |
|---|---|---|
| DE | 102011085543 A1 | 5/2013 |
| GB | 949966 A | 2/1964 |
| GB | 1318307 A | 5/1973 |
| JP | S54-054769 U | 4/1979 |
| JP | H11-063245 A | 3/1999 |
| JP | 2000-230540 A | 8/2000 |
| JP | 3412480 B2 | 6/2003 |
| JP | 2003-247529 A | 9/2003 |
| WO | 2014/181672 A1 | 11/2014 |

* cited by examiner

BALL JOINT

CROSS-REFERENCE TO RELATED APPLICATIONS

This application is a National Stage of International Application No. PCT/JP2016/065566, filed May 26, 2016 (now WO 2016/190385A1), which claims priority to Japanese Application No. 2015-108511, filed May 28, 2015. The entire disclosures of each of the above applications are incorporated herein by reference.

FIELD

The present disclosure relates to a ball joint provided in various apparatuses such as a vehicle.

BACKGROUND

Conventionally, various apparatuses such as a vehicle are provided with a ball joint. For example, in a suspension of an automobile, a ball joint is fitted to a knuckle provided in a vehicle body. A dust cover is used on the ball joint in order to prevent water, dust, and the like from entering a joint section and to prevent grease from flowing out from the joint section. A ball joint according to a conventional example will now be described with reference to FIG. 8. FIG. 8 is a schematic sectional view of a ball joint according to a conventional example.

A ball joint 600 includes a ball stud 610 having a spherical section 612 at one end of a shaft section 611, a socket 620 which rotatably and swingably supports the ball stud 610, and a dust cover 630 which suppresses dust from entering the socket 620. In addition, the dust cover 630 has a seal main body which is made of an elastic body and which integrally includes a deformable film-like body section 631, a fixed section 632 which is provided at one end of the body section 631 and which is fixed to the socket 620, and an inner circumferential seal section 634 and a dust seal section 635 which are provided at another end of the body section 631. Moreover, the inner circumferential seal section 634 slides with respect to the shaft section 611 of the ball stud 610 and the dust seal section 635 slides with respect to the knuckle (not shown) described earlier.

The ball joint 600 configured as described above is shipped to vehicle manufacturers and the like in a state where the ball joint 600 is unitized by the ball stud 610, the socket 620, and the dust cover 630. Subsequently, at a shipping destination, the ball joint 600 is fitted to a knuckle (not shown) provided in a vehicle body. Specifically, the ball joint 600 is fitted to the knuckle by inserting the shaft section 611 into an insertion hole provided on the knuckle and fastening the shaft section 611 by a nut. In the process of the shaft section 611 being inserted into the insertion hole, the dust cover 630 is pushed by the knuckle in a direction of an arrow P in FIG. 8 and the body section 631 of the dust cover 630 bulges outward.

If the ball joint 600 is fitted to the knuckle in a state where the body section 631 bulges outward, the body section 631 deforms effortlessly when the ball stud 610 swings or rotates. However, there may be cases where a part of the body section 631 deforms so as to buckle inward when the ball joint 600 is fitted to the knuckle. A dotted line 631X in FIG. 8 represents an example of a state where a part of the body section 631 has deformed so as to buckle inward. When the ball stud 610 swings or rotates in a state where the body section 631 is deformed in this manner, there is a risk that stress may concentrate on a part of the body section 631 to cause damage.

When the dust cover 630 is pushed in the direction of the arrow P from a state where the body section 631 is at its natural length, a buckling deformation as described above is unlikely to occur. However, there may be cases where the dust cover 630 is stretched longer than its natural length at the time of shipping or the like. FIG. 8 shows a state where the dust cover 630 is stretched longer than its natural length by H. When the dust cover 630 is pushed in the direction of the arrow P from a state where the dust cover 630 is stretched longer than its natural length in this manner, a buckling deformation as described above is likely to occur. In recent years, progress has been made in downsizing ball joints and diameters of the socket 620 and the dust cover 630 tend to be smaller. Accordingly, problems such as that described above are becoming more apparent.

CITATION LIST

Patent Literature

[PTL 1] Japanese Patent No. 3412480

SUMMARY

Technical Problem

An object of the present disclosure is to provide a ball joint capable of stabilizing a posture of a dust cover.

Solution to Problem

In order to solve the problem described above, the present disclosure adopts the following means.

Specifically, a ball joint according to the present disclosure is a ball joint to be fitted to a fitted member, the ball joint including: a ball stud which has a shaft, the shaft being provided with a spherical section on one end side thereof; a socket which has a bearing for the spherical section and which rotatably and swingably supports the ball stud; and a dust cover which suppresses dust from entering the socket, wherein the shaft section has an annular projection, the dust cover has a seal main body which is made of an elastic body and which integrally includes: a deformable body section; a fixed section which is provided in the body section on the one end side and which is fixed to the socket; an inner circumferential seal section which is provided in the body section on another end side and which is configured to be slidable on an outer circumferential surface of the shaft section (in the present disclosure, in addition to the shaft section itself of the ball stud, includes a shaft section of a different member provided on a side of an outer circumferential surface of the shaft section of the ball stud; the same applies hereinafter); and a dust seal section which is provided in the body section on the other end side and which stretches toward the other end side, and the ball joint is provided with a positioning member which is mounted to the shaft section in advance before the ball joint is fitted to the fitted member and which positions an end of the dust cover on the other end side with respect to the shaft section so that the inner circumferential seal section is positioned at an opposite side of the spherical section across the annular projection in a state where the body section bulges outward.

According to the present disclosure, before the ball joint is fitted to the fitted member, the dust cover on the other end side is positioned by the positioning member in a state where the body section bulges. Therefore, when the ball joint is fitted to the fitted member, a deformation of a part the body section of the dust cover so as to buckle inward is suppressed. In this manner, the posture of the dust cover can be stabilized.

Favorably, the positioning member includes: a metal plate which has an insertion hole through which the shaft section is inserted; and an elastic member which is provided along an inner circumferential surface of the insertion hole in the metal plate and which comes into close contact with an outer circumferential surface of the shaft section.

Accordingly, due to elastic repulsion of the elastic member, the positioning member can be readily mounted to the shaft section. In addition, a sealing function is also exhibited by the elastic member.

Favorably, a force by which the elastic member is fixed to the shaft section by elastic repulsion of the elastic member is greater than a force by which the dust cover in a deflected state is facilitated to return to an original state.

Accordingly, the inner circumferential seal section of the dust cover can be readily positioned to a desired position.

Favorably, the dust seal section is configured to be slidable on a surface of the metal plate.

Favorably, in a state where the ball joint is fitted to the fitted member, the inner circumferential seal section is positioned between the positioning member and the annular projection.

In this manner, since the inner circumferential seal section is positioned at a position on an opposite side of the spherical section across the annular projection, the inner circumferential seal section is not adversely affected by the annular projection when the ball joint is fitted to the fitted member. In addition, since the annular projection functions as a stopper, movement of the dust cover on the other end side toward a side of the spherical section can be restricted.

Moreover, the respective configurations described above can be adopted in combination with each other to the extent feasible.

Advantageous Effects of the Disclosure

As described above, according to the present disclosure, the posture of the dust cover can be stabilized.

DRAWINGS

DETAILED DESCRIPTION

Hereinafter, a mode for implementing the present disclosure will be described in detail by way of example of an embodiment with reference to the drawings. However, it is to be understood that dimensions, materials, shapes, relative arrangements, and the like of components described in the embodiment are not intended to limit the scope of the disclosure thereto unless otherwise specifically noted. In the following embodiment, a ball joint to be fitted to a knuckle provided in a suspension of an automobile will be described as an example.

Embodiment

Figure 1:
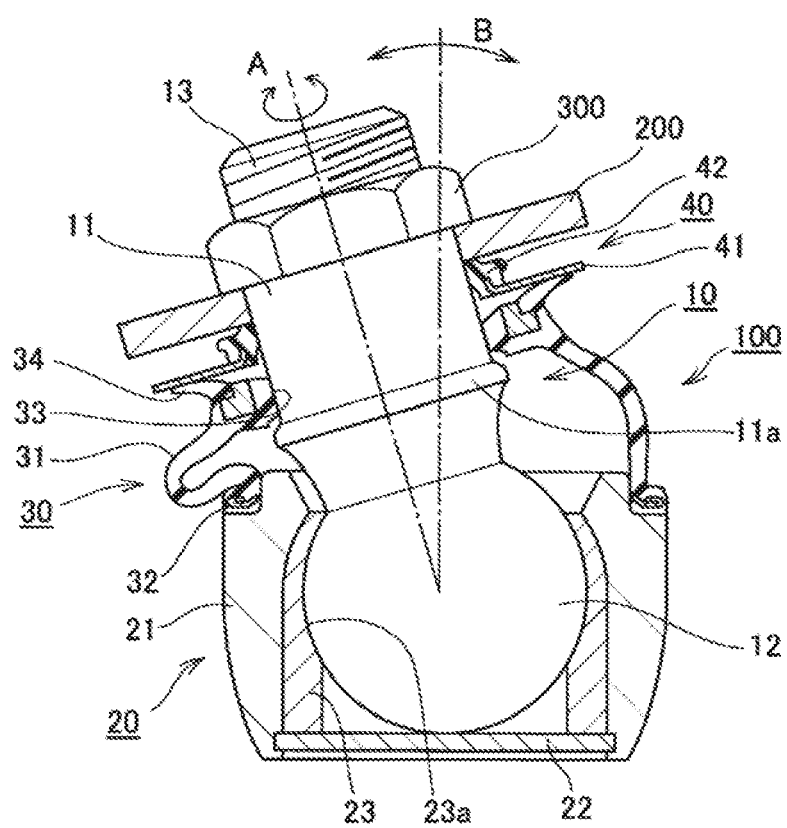
FIG. 1 is a schematic sectional view showing a state where a ball joint according to an embodiment of the present disclosure is being used.
Figure 2:
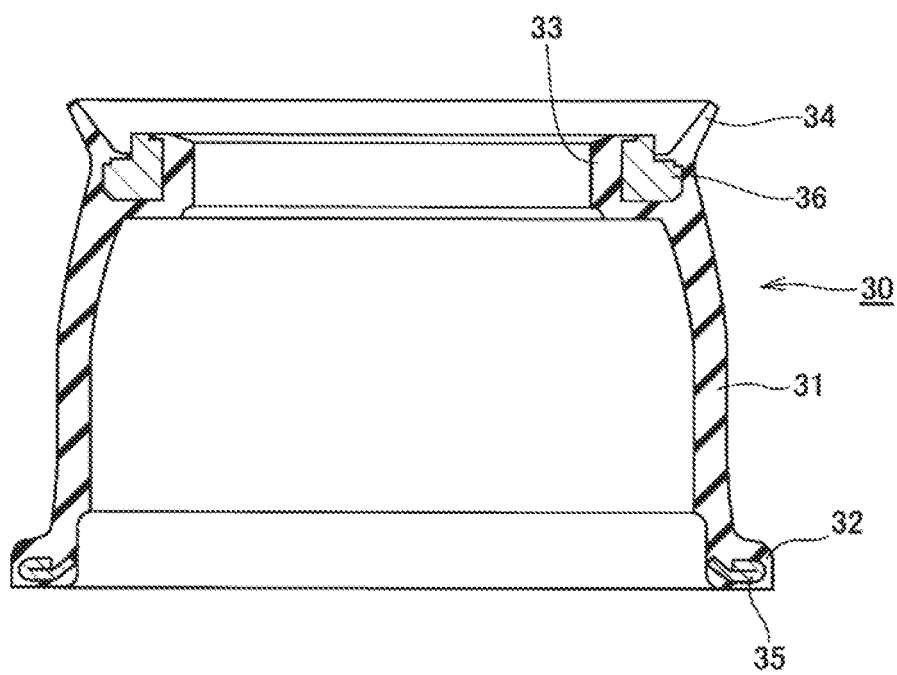
FIG. 2 is a schematic sectional view of a dust cover according to an embodiment of the present disclosure.
Figure 3:
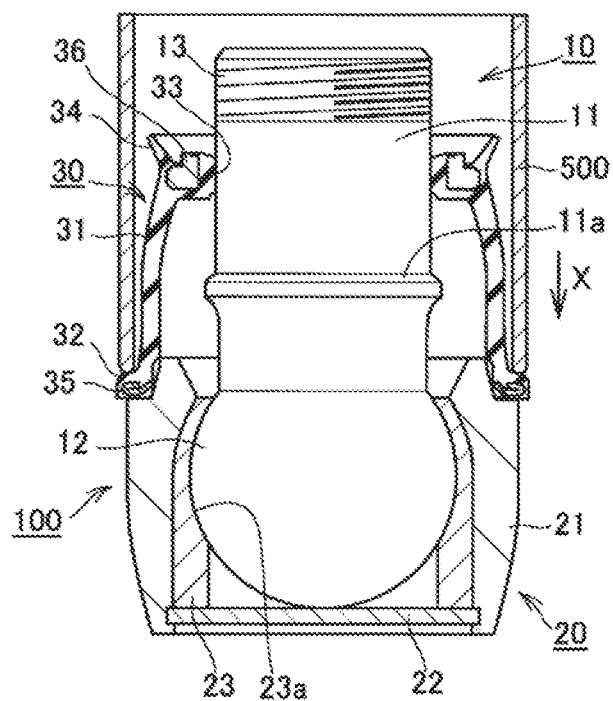
FIG. 3 is a diagram illustrating an assembly procedure of a ball joint according to an embodiment of the present disclosure.
Figure 4:
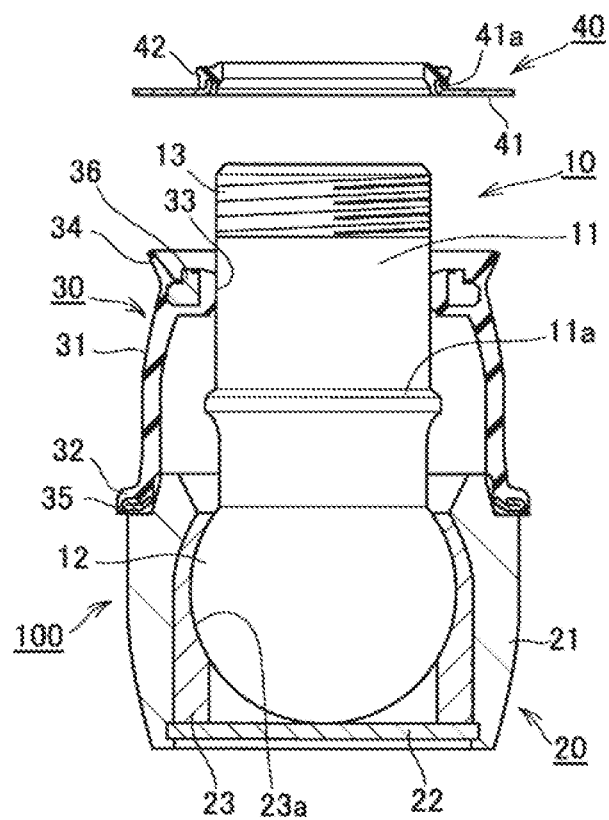
FIG. 4 is a diagram illustrating an assembly procedure of a ball joint according to an embodiment of the present disclosure.
Figure 5:
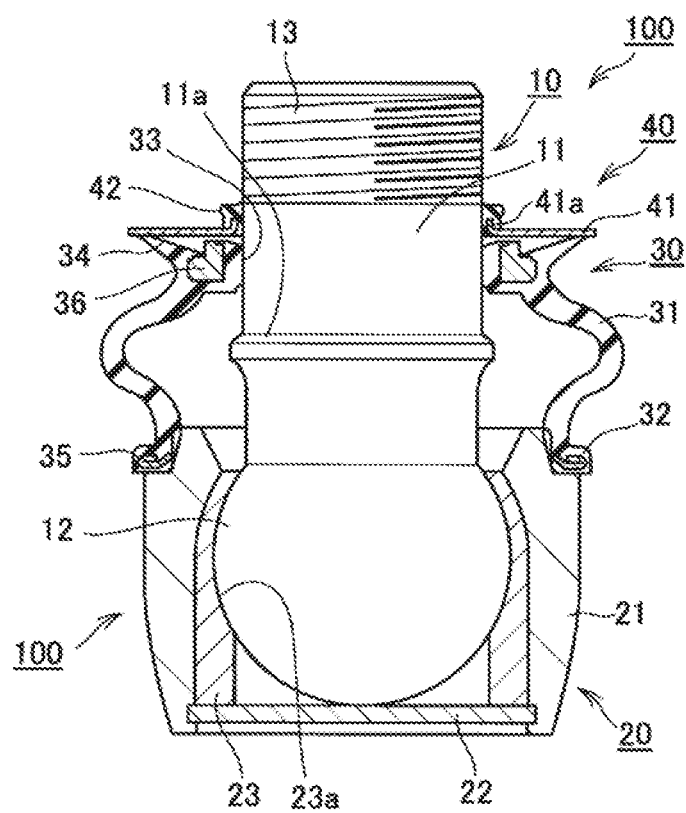
FIG. 5 is a diagram illustrating an assembly procedure of a ball joint according to an embodiment of the present disclosure.
Figure 6:
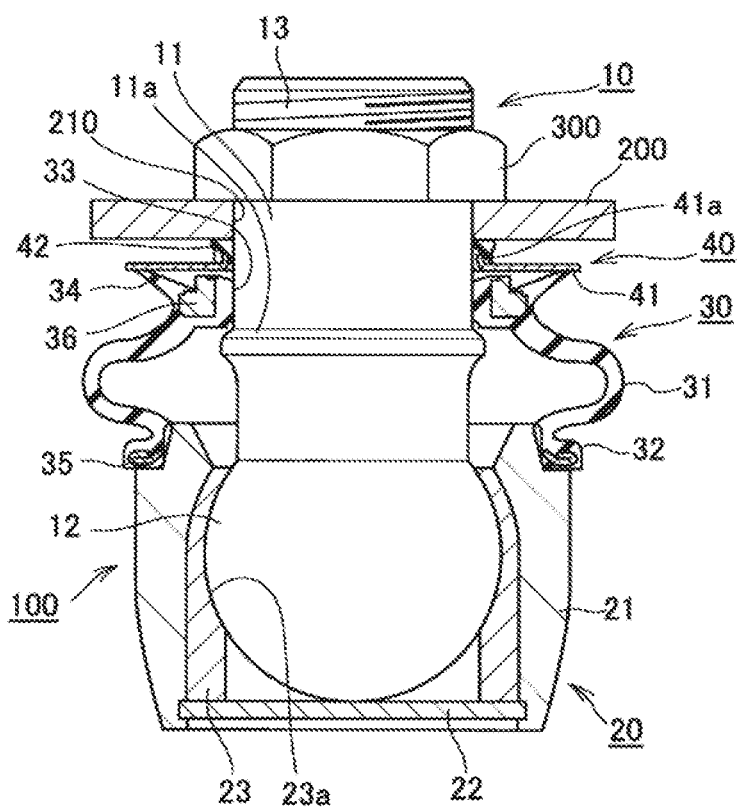
FIG. 6 is a schematic sectional view showing a state where a ball joint according to an embodiment of the present disclosure is fitted to a knuckle.

A ball joint according to an embodiment of the present disclosure will be described with reference to FIGS. 1 to 6. FIG. 1 is a schematic sectional view showing a state where the ball joint according to the embodiment of the present disclosure is being used. FIG. 1 shows a sectional view obtained by cutting at a plane including a central axial line of a shaft section of a ball stud provided in the ball joint. FIG. 2 is a schematic sectional view of a dust cover according to the embodiment of the present disclosure. FIG. 2 shows a sectional view obtained by cutting at a plane including a central axial line of an annular dust cover in a state where the dust cover is not deformed. FIGS. 3 to 5 are diagrams illustrating an assembly procedure of the ball joint according to the embodiment of the present disclosure. In each diagram, each member is shown in a schematic sectional view. FIG. 6 is a schematic sectional view showing a state where the ball joint according to the embodiment of the present disclosure is fitted to a knuckle. FIG. 6 shows a sectional view obtained by cutting at a plane including the central axial line of the shaft section of the ball stud provided in the ball joint.

<Ball Joint>

An example of a ball joint 100 according to the present embodiment will be described particularly with reference to FIG. 1. The ball joint 100 is fitted to a knuckle 200 as a fitted member provided in a vehicle body. The ball joint 100 includes a ball stud 10 having a shaft section 11, which is provided with a spherical section 12 on one end side thereof. The ball joint 100 includes a socket 20 which rotatably and swingably supports the ball stud 10, and a dust cover 30 which suppress dust from entering the socket 20. As shown in FIG. 1, the ball stud 10 is configured to be rotatable in a direction of an arrow A and swingable in a direction of an arrow B. An annular projection 11*a* is provided on the shaft section 11 of the ball stud 10. A male screw 13 is formed on the shaft section 11 on another end side. The ball joint 100 is fixed to the knuckle 200 by fastening a nut 300 to the male screw 13.

The socket 20 includes an annular case 21, a bottom plate 22 fixed to a bottom of the case 21, and a bearing 23 for the spherical section 12. The bearing 23 has a bearing surface 23*a* constituted by a spherical surface with a same radius as a curvature radius of the spherical section 12. The dust cover 30 is configured to prevent water, dust, and the like from entering a joint section in the socket 20 and to prevent grease from flowing out from the joint section. The ball joint 100 according to the present embodiment is provided with a positioning member 40 which is mounted to the shaft section 11 in advance before the ball joint 100 is fitted to the knuckle 200 and which positions an end of the dust cover 30 on the other end side.

<Dust Cover>

An overall configuration of the dust cover 30 will now be described particularly with reference to FIG. 2. The dust cover 30 includes a seal main body made of an elastic body such as rubber (for example, chloroprene rubber). The seal main body integrally includes a deformable annular and film-like body section 31, a fixed section 32 which is provided in the body section 31 on the one end side and which is fixed to the socket 20, and an inner circumferential seal section 33 and a dust seal section 34 which are provided in the body section 31 on the other end side. A reinforcing ring 35 is provided inside the fixed section 32. A reinforcing ring 36 is also internally provided near the other end of the body section 31.

In the dust cover 30 configured as described above, when the ball stud 10 swings with respect to the socket 20, the body section 31 deforms (see FIG. 1). When the ball stud 10 rotates with respect to the socket 20, the inner circumferential seal section 33 slides with respect to an outer circumferential surface of the shaft section 11 of the ball stud 10 and the dust seal section 34 slides with respect to a surface of a metal plate 41 in the positioning member 40. Accordingly, a sealing function is exhibited by the dust cover 30 in both cases where the ball stud 10 swings and where the ball stud 10 rotates with respect to the socket 20.

<Assembly Procedure of Ball Joint>

An assembly procedure of the ball joint according to the present embodiment will be described with reference to FIGS. 3 to 5. First, as the fixed section 32 is pushed in a direction of an arrow X in FIG. 3 by a cylindrical jig 500, the dust cover 30 is fixed to an end of the case 21 in the socket 20. Next, the positioning member 40 is mounted to the shaft section 11. The positioning member 40 is constituted by the metal plate 41 having an insertion hole through which the shaft section 11 is inserted, and an elastic member 42 which is provided along an inner circumferential surface of the insertion hole in the metal plate 41 and which comes into close contact with an outer circumferential surface of the shaft section 11. In the present embodiment, the inner circumferential surface side of the metal plate 41 is bent so as to form a cylinder section 41a. The elastic member 42 is integrally formed so as to cover the cylinder section 41a.

As described above, the positioning member 40 is mounted in advance to the shaft section 11 before the ball joint 100 is fitted to the knuckle 200 which is a fitted member. The positioning member 40 is configured to position the other end of the dust cover 30 with respect to the shaft section 11 in a state where the body section 31 of the dust cover 30 bulges outward, so that the inner circumferential seal section 33 is positioned at an opposite side of the spherical section 12 across the annular projection 11a (see FIG. 5). The elastic member 42 in the positioning member 40 is configured to exhibit a sealing function by coming into close contact with an outer circumferential surface of the shaft section 11. A force by which the elastic member 42 is fixed to the shaft section 11 by elastic repulsion of the elastic member 42 is set greater than a force by which the dust cover 30 in a deflected state is facilitated to return to a natural state. Accordingly, the other end of the dust cover 30 can be positioned by the positioning member 40 in a state where the body section 31 bulges outward. The ball joint 100 configured as described above is shipped to vehicle manufacturers and the like in a state where the ball joint 100 is unitized by the ball stud 10, the socket 20, the dust cover 30, and the positioning member 40.

<Fitting Procedure of Ball Joint to Fitted Member (Knuckle)>

A fitting procedure of the ball joint 100 to the knuckle 200 according to the present embodiment will be described particularly with reference to FIG. 6. At a shipping destination, the ball joint 100 is fitted to the knuckle 200 provided in a vehicle body. The shaft section 11 is inserted into an insertion hole 210 provided in the knuckle 200. The ball joint 100 is fitted to the knuckle 200 by fastening a nut 300 to the male screw 13 of the shaft section 11. In the process of the shaft section 11 being inserted into the insertion hole 210, the dust cover 30 is pushed by the knuckle 200 toward a side of the socket 20 and the body section 31 of the dust cover 30 further bulges outward. At this point, as described above, the dust cover 30 has been positioned by the positioning member 40 and the body section 31 is already in a state where the body section 31 is bulging to a certain degree. Therefore, in the process of the dust cover 30 being pushed toward the socket 20 by the knuckle 200, a deformation in which a part of the body section 31 buckles inward does not occur. The inner circumferential seal section 33 is configured such that, in a state where the ball joint 100 is fitted to the knuckle 200, the inner circumferential seal section 33 is positioned between the positioning member 40 and the annular projection 11a.

Figure 7:
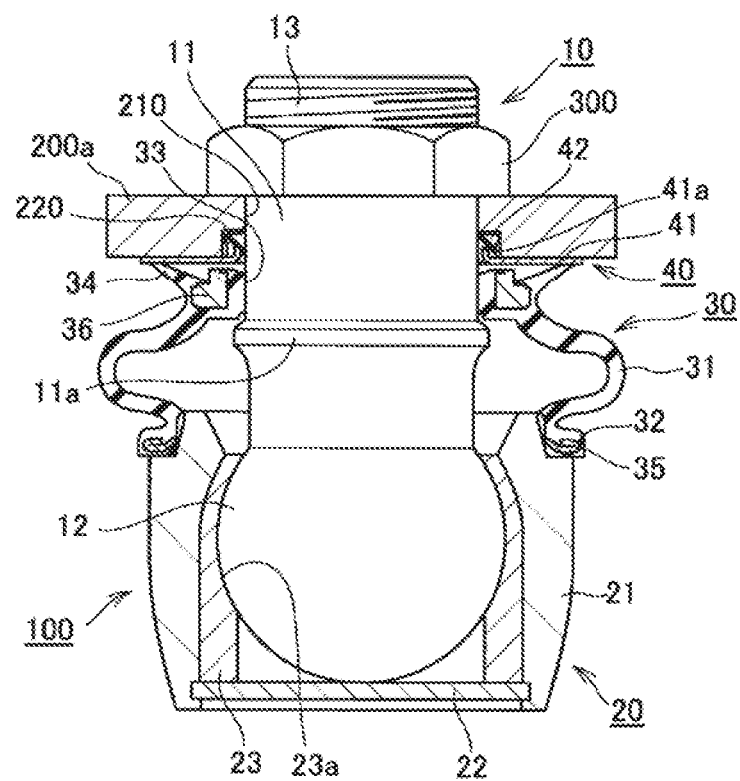
FIG. 7 is a schematic sectional view showing a state where a ball joint according to a modification of the present disclosure is fitted to a knuckle.
Figure 8:
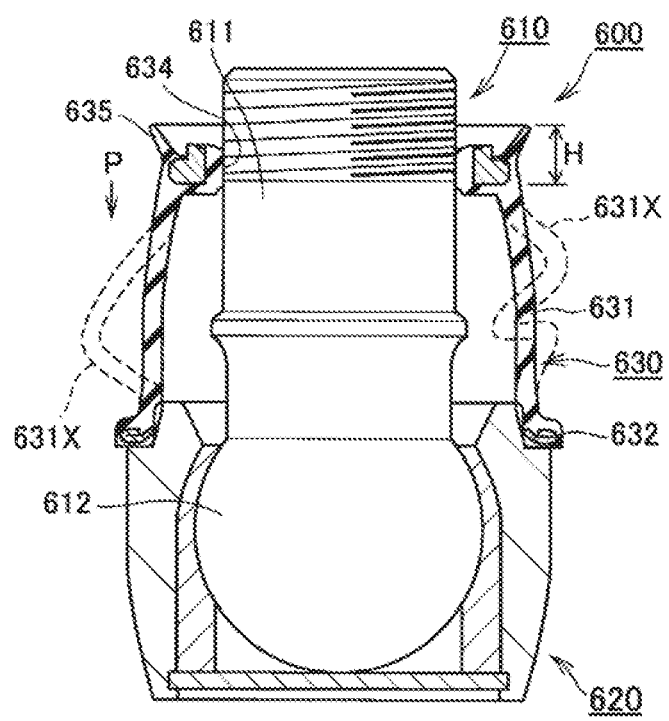
FIG. 8 is a schematic sectional view of a ball joint according to a conventional example.

In the present embodiment, a configuration is adopted in which only an end surface of one end of the elastic member 42 in the positioning member 40 abuts against the knuckle 200. In this case, depending on various conditions, a fixing force of the positioning member 40 to the shaft section 11 may become insufficient and, when the ball stud 10 rotates, the positioning member 40 may rotate together with the shaft section 11. In consideration thereof, as in a modification shown in FIG. 7, a configuration may be adopted in which an annular recess 220 is formed on an inner circumferential surface of an insertion hole 210 in a knuckle 200a and the elastic member 42 is fitted to the annular recess 220. Accordingly, the fixing force of the positioning member 40 to the shaft section 11 can be increased and the positioning member 40 can be prevented from rotating together with the shaft section 11. FIG. 7 is a schematic sectional view showing a state where a ball joint according to a modification of the present disclosure is fitted to a knuckle. Since components other than the knuckle are the same as those of the embodiment described above, the same components will be denoted by the same reference characters and a description thereof will be omitted.

<Advantages of Ball Joint According to Present Embodiment>

With the ball joint 100 according to the present embodiment configured as described above, before the ball joint 100 is fitted to the knuckle 200, the other end of the dust cover 30 is positioned by the positioning member 40 in a state where the body section 31 bulges. Therefore, when the ball joint 100 is fitted to the knuckle 200, a deformation of bucking inward of a part of the body section 31 of the dust cover 30 is suppressed. In this manner, the posture of the dust cover 30 can be stabilized.

The positioning member 40 according to the present embodiment is constituted by: the metal plate 41; and the elastic member 42 which is provided along an inner circumferential surface of an insertion hole in the metal plate 41 and which comes into close contact with an outer circumferential surface of the shaft section 11. Accordingly, due to elastic repulsion of the elastic member 42, the positioning member 40 can be readily mounted to the shaft section 11. A sealing function is also exhibited by the elastic member 42. In the present embodiment, a force by which the elastic member 42 is fixed to the shaft section 11 by the elastic repulsion of the elastic member 42 is set greater than a force by which the dust cover 30 in a deflected state is facilitated to return to an original state. Accordingly, the inner circumferential seal section 33 of the dust cover 30 can be readily positioned to a desired position.

In the present embodiment, the inner circumferential seal section 33 is configured such that, in a state where the ball joint 100 is fitted to the knuckle 200, the inner circumferential seal section 33 is positioned between the positioning member 40 and the annular projection 11a. In this manner, the inner circumferential seal section 33 is positioned at an opposite side of the spherical section 12 across the annular projection 11a. Therefore, the annular projection 11a is not an obstacle for the inner circumferential seal section 33 when the ball joint 100 is fitted to the knuckle 200. Since the annular projection 11a functions as a stopper, movement of the other end of the dust cover 30 toward a side of the spherical section 12 can be restricted.

(Other)

In the embodiment described above, a case where the inner circumferential seal section 33 slides with respect to an outer circumferential surface of the shaft section 11 itself of the ball stud 10 has been presented. However, the present disclosure can also be applied to a case where an inner circumferential seal section is slidably configured with respect to an outer circumferential surface of a different member provided on an outer circumferential surface of the shaft section 11 of the ball stud 10. For example, as in the case of a technique disclosed in Japanese Patent Application Laid-open No. H11-63245, the present disclosure can also be applied to a configuration provided with a ferrule when an inner circumferential seal section slides with respect to the ferrule. As in the case of a technique disclosed in Japanese Utility Model Application Laid-open No. H03-32211, the present disclosure can also be applied to a configuration provided with a retaining member (a retainer) including a flange when an inner circumferential seal section slides with respect to the retainer.

REFERENCE SIGNS LIST

10 Ball stud
11 Shaft section
11a Annular projection
12 Spherical section
13 Male screw
20 Socket
21 Case
22 Bottom plate
23 Bearing
23a Bearing surface
30 Dust cover
31 Body section
32 Fixed section
33 Inner circumferential seal section
34 Dust seal section
35 Reinforcing ring
36 Reinforcing ring
40 Positioning member
41 Metal plate
41a Cylinder section
42 Elastic member
100 Ball joint
200, 200a Knuckle
210 Insertion hole
220 Annular recess
300 Nut
500 Jig

The invention claimed is:

1. A ball joint to be fitted to a fitted member, the ball joint comprising:
a ball stud which has a shaft, the shaft being provided with a spherical section on one end side thereof;
a socket which has a bearing for the spherical section and which rotatably and swingably supports the ball stud; and
a dust cover which suppresses dust from entering the socket, wherein
the shaft section has an annular projection,
the dust cover has a seal main body which is made of an elastic body and which integrally includes:
a deformable body section;
a fixed section which is provided in the body section on the one end side and which is fixed to the socket;
an inner circumferential seal section which is provided in the body section on another end side and which is configured to be slidable on an outer circumferential surface of the shaft section; and
a dust seal section which is provided in the body section on the other end side and which stretches toward the other end side,
the ball joint is provided with a positioning member which is mounted to the shaft section in advance before the ball joint is fitted to the fitted member and which positions an end of the dust cover on the other end side with respect to the shaft section so that the inner circumferential seal section is positioned at an opposite side of the spherical section across the annular projection in a state where the body section bulges outward, and
the positioning member includes:
a metal plate which has an insertion hole through which the shaft section is inserted; and
an elastic member which is provided along an inner circumferential surface of the insertion hole in the metal plate and which comes into close contact with an outer circumferential surface of the shaft section.

2. The ball joint according to claim 1, wherein a force by which the elastic member is fixed to the shaft section by elastic repulsion of the elastic member is greater than a force by which the dust cover in a deflected state is facilitated to return to an original state.

3. The ball joint according to claim 1, wherein the dust seal section is configured to be slidable on a surface of the metal plate.

4. The ball joint according to claim 1, wherein in a state where the ball joint is fitted to the fitted member, the inner circumferential seal section is positioned between the positioning member and the annular projection.

* * * * *